(12) United States Patent
Gissin et al.

(10) Patent No.: US 11,579,803 B2
(45) Date of Patent: Feb. 14, 2023

(54) NVME-BASED DATA WRITING METHOD, APPARATUS, AND SYSTEM

(71) Applicant: HUAWEI TECHNOLOGIES CO., LTD., Guangdong (CN)

(72) Inventors: Victor Gissin, Shenzhen (CN); Junying Li, Shenzhen (CN); Guanfeng Zhou, Hangzhou (CN); Jiashu Lin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/130,363

(22) Filed: Dec. 22, 2020

(65) Prior Publication Data
US 2021/0109681 A1  Apr. 15, 2021

Related U.S. Application Data

(63) Continuation of application No. PCT/CN2018/093921, filed on Jun. 30, 2018.

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0604* (2013.01); *G06F 3/0679* (2013.01);
(Continued)

(58) Field of Classification Search
CPC .... G06F 3/0659; G06F 3/0604; G06F 3/0679; G06F 13/1668; G06F 13/4282; G06F 2213/0026
See application file for complete search history.

(56) References Cited

U.S. PATENT DOCUMENTS

| | | | |
|---|---|---|---|
| 10,503,434 B2 * | 12/2019 | McGlaughlin et al. | ............ G06F 3/0656 |
| 2013/0086311 A1 | 4/2013 | Huang et al. | |
| 2014/0195634 A1 | 7/2014 | Kishore et al. | |
| 2014/0281106 A1 | 9/2014 | Saghi et al. | |
| 2014/0325013 A1 | 10/2014 | Tamir et al. | |

(Continued)

FOREIGN PATENT DOCUMENTS

| | | | |
|---|---|---|---|
| CN | 103080917 A | 5/2013 | |
| CN | 103970688 A | 8/2014 | |

(Continued)

OTHER PUBLICATIONS

Nvmexpress Workgroup: "NVM Express™ Revision 1.3c," 1 NVM Express™ Base Specification, XP055800189, total 2 pages (May 24, 2018).

(Continued)

*Primary Examiner* — Idriss N Alrobaye
*Assistant Examiner* — Richard B Franklin
(74) *Attorney, Agent, or Firm* — Leydig, Voit & Mayer, Ltd.

(57) ABSTRACT

In an NVMe-based storage system, a host is connected to an NVMe controller through a PCIe bus, and the NVMe controller is connected to a storage medium. The NVMe controller receives from the host a data packet that carries payload data and an association identifier. The association identifier associates the payload data with a write instruction. The NVMe controller obtains the write instruction according to the association identifier, and then writes the payload data into the storage medium according to the write instruction.

14 Claims, 9 Drawing Sheets

(52) U.S. Cl.
CPC ...... *G06F 13/1668* (2013.01); *G06F 13/4282* (2013.01); *G06F 2213/0026* (2013.01)

(56) References Cited

U.S. PATENT DOCUMENTS

| | | |
|---|---|---|
| 2015/0261434 A1 | 9/2015 | Kagan et al. |
| 2016/0124876 A1 | 5/2016 | Vucinic et al. |
| 2016/0127468 A1 | 5/2016 | Malwankar et al. |
| 2016/0127492 A1 | 5/2016 | Malwankar et al. |
| 2016/0162189 A1 | 6/2016 | Malwankar |
| 2017/0185316 A1 | 6/2017 | Nieuwejaar |
| 2017/0286363 A1 | 10/2017 | Joshua et al. |
| 2018/0074757 A1 | 3/2018 | Yamaguchi et al. |
| 2018/0183901 A1 | 6/2018 | Lariviere et al. |
| 2018/0321945 A1 | 11/2018 | Benisty |
| 2019/0303289 A1 | 10/2019 | Yoshii et al. |

FOREIGN PATENT DOCUMENTS

| | | |
|---|---|---|
| CN | 106210041 A | 12/2016 |
| CN | 106484549 A | 3/2017 |
| CN | 107077426 A | 8/2017 |
| CN | 107209644 A | 9/2017 |
| CN | 107608909 A | 1/2018 |
| CN | 107832086 A | 3/2018 |
| CN | 107992436 A | 5/2018 |
| CN | 108089951 A | 5/2018 |
| EP | 3260971 A1 | 12/2017 |

OTHER PUBLICATIONS

Marks, "An NVM Express Tutorial," Flash Memory Summit, 2013 [retrieved from Internet Oct. 21, 2021,[URL:https://www.flashmemorysummit.com/English/Collaterals/Proceedings/2013/20130812_PreConfD_Marks.pdf>] (Year: 2013), total 92 pages.
"NVM Express Revision 1.3," total 282 pages (May 1, 2017).
Minturn et al., "Under the Hood with NVMe over Fabrics," SNIA, 2015 [retrieved from Internet Oct. 20, 2021][URL: https://www.snia.org/sites/default/files/ESF/NVMe_UnderHood_12_15_Final2.pdf>] (Year: 2015), total 47 pages.

* cited by examiner

100

500

501. An NVMe controller receives a data packet sent by a host, where the data packet carries payload data and an association identifier, and the association identifier is used to associate the payload data and a write instruction

502. The NVMe controller obtains the write instruction

503. The NVMe controller writes the payload data into a storage medium based on the write instruction

FIG. 5

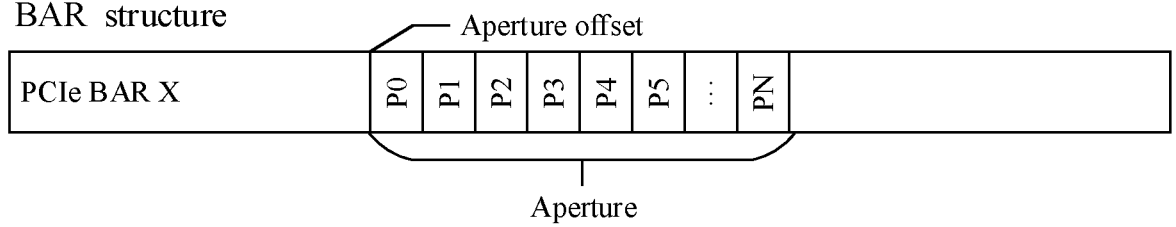

FIG. 6

NVME-BASED DATA WRITING METHOD, APPARATUS, AND SYSTEM

CROSS-REFERENCE TO RELATED APPLICATIONS

This application is a continuation of International Application PCT/CN2018/093921, filed on Jun. 30, 2018, the disclosure of which is hereby incorporated by reference in its entirety

TECHNICAL FIELD

This application relates to the storage field, and relates to a non-volatile memory express (NVMe)-based data writing method, apparatus, and system.

BACKGROUND

With development of storage technologies, especially in a solid state drive (SSD) using a flash memory (Flash) as a storage medium, a serial advanced technology attachment (SATA) interface standard and a serial ATA advanced host controller interface (AHCI) standard that are designed for a conventional mechanical hard disk cannot meet requirements of storage devices. This becomes a bottleneck limiting a processing capability of the storage device. A standard about non-volatile memory express (NVMe) rises to the occasion. The NVMe interface allows a host (Host) to communicate with a non-volatile memory (NVM) subsystem. The interface used by the NVM subsystem (including a controller and a storage medium) for communication is attached to a peripheral component interconnect express (PCIe) bus interface as a register interface, to optimize enterprise-level solid-state storage and consumer-level solid-state storage, such that the storage has advantages such as high performance and a low access latency.

The NVMe interface is based on a paired submission queue (SQ) and completion queue (CQ) mechanism. A command is placed by a host in a submission queue. Completion information is placed by a controller in a corresponding completion queue. Each submission queue entry (SQE) is a command. In a write instruction, a memory address used for data transmission is specified by using a physical region page (PRP) or a scatter/gather list (SGL). After obtaining the write instruction, the NVMe performs a PCIe read operation to read to-be-written data from storage space indicated by the memory address used for data transmission, and writes the to-be-written data into a storage medium.

SUMMARY

Various embodiments disclose an NVMe-based data writing method, apparatus, and system. A host directly pushes a data packet to an NVMe controller, and adds payload data and an association identifier to the pushed data packet. The association identifier is used to associate the payload data with a write instruction. After receiving the data packet pushed by the host, the NVMe controller determines, based on the association identifier, the write instruction associated with the data packet, and writes the payload data in the data packet into a storage medium according to the write instruction.

According to a first aspect, this embodiment discloses an NVMe-based data writing system, and the system includes a host, an NVMe controller, and a storage medium. The storage medium is a non-volatile storage medium, and is configured to store host data. The host is configured to: trigger a write instruction, and send a data packet to the NVMe controller. The data packet carries payload data and an association identifier, and the association identifier is used to associate the payload data with the write instruction. After obtaining, based on the association identifier, the payload data and the write instruction that have an association relationship, the NVMe controller writes the payload data into the storage medium according to the write instruction.

The write instruction may be further an SQE. A further procedure in which the host triggers the write instruction may be: The host writes the SQE into an SQ, and notifies the NVMe controller by using a doorbell. That the host sends the data packet to the NVMe controller is further: The host actively pushes the data packet to the NVMe controller. Furthermore, the host pushes the data packet to the NVMe controller through a data portal. A portal address may be a PCIe address opened by the NVMe controller to the host. The host pushes to-be-written data to the NVMe controller by using the PCIe address. To be further, the data packet is a PCIe write packet, and the data packet carries the portal address. The host actively pushes the data packet to the NVMe controller by using the data packet. Before triggering the SQE, the host does not need to completely prestore the to-be-written data in storage space indicated by a PRP or an SGL. In this embodiment, a pipeline operation can be implemented, to reduce a delay caused because the host prepares the to-be-written data, and save storage space used to completely store the to-be-written data. In addition, a PRP field or an SGL field is no longer required in the SQE, thereby reducing bandwidth occupation.

With reference to the first aspect, in a first example implementation of the first aspect, the NVMe controller includes an internal memory, and before writing the payload data into the storage medium, the NVMe controller is further configured to: allocate storage space in the internal memory for the payload data, store the payload data in the allocated storage space, and record a mapping relationship between the allocated storage space and the association identifier.

The internal storage space may be a private memory of the NVMe controller. The internal storage space is no longer accessed by the host in a PCIe addressing manner, and is not or is not used as a command memory buffer (CMB). After receiving the data packet pushed by the host, the NVMe controller does not write the payload data into storage space indicated by the portal address, but allocates corresponding storage space in the local internal storage space for the portal address, and buffers the payload data by using the internal memory.

With reference to the first example implementation of the first aspect, in a second example implementation of the first aspect, the NVMe controller organizes the internal memory of the NVMe controller in a memory block form, and the internal memory includes a plurality of memory blocks. The NVMe controller is further configured to provide the host with a quantity of memory blocks in the internal memory and a size of the memory block. The host includes a counter, and the counter is configured to indicate a quantity of unoccupied memory blocks. After sending the data packet to the NVMe controller, the host is further configured to reduce a value of the counter.

The NVMe controller may open the quantity of memory blocks in the internal memory of the NVMe controller and the size of the memory block to the host in a form of configuration information, or the like. The host reads the configuration information to obtain the quantity of memory blocks and the size of the memory block, and maintains the counter to determine a quantity of available memory blocks in the NVMe controller. An initial value of the counter may be the quantity of memory blocks in the NVMe controller, and decreases as data is pushed. When the counter is 0, the host cannot send the data packet to the NVMe controller any longer. This avoids memory overflow and ensures data security.

With reference to the second example implementation of the first aspect, in a third example implementation of the first aspect, after writing the payload data into the storage medium, the NVMe controller is further configured to trigger a memory block release report, where the memory block release report is used to indicate that the NVMe controller releases a memory block. After obtaining the memory block release report, the host is further configured to increase the value of the counter based on the memory block release report.

The NVMe controller may trigger the memory block release report by using a doorbell. To reduce pressure on the host to process doorbells, the NVMe controller may aggregate a plurality of doorbells. After obtaining the memory block release report, the host increases the value of the counter based on a quantity of memory blocks released by the NVMe controller.

With reference to the third example implementation of the first aspect, in a fourth example implementation of the first aspect, the host includes a plurality of counters, and each counter corresponds to at least one write instruction. The memory block release report further includes the association identifier, and the host is further configured to increase, based on the memory block release report and the association identifier, a value of a counter corresponding to the write instruction.

For example, the host may divide write operations into a plurality of levels based on different priorities of the write operations. Each level corresponds to a respective counter, and a counter corresponding to a different level represents a quantity of unoccupied memory blocks available for a write operation at the level. The host determines a level of the released memory block based on the association identifier in the memory block release report, and correspondingly increases a value of a counter at the level. Alternatively, the host may maintain the counter for a single write instruction or SQ. A further implementation of the counter is not limited in the present disclosure.

With reference to any one of the first aspect or the foregoing example implementations of the first aspect, in a fifth example implementation of the first aspect, the data packet is a PCIe packet, the association identifier is first address information of the PCIe packet, and the NVMe controller is further configured to: determine second address information based on the first address information, and obtain the write instruction based on the second address information, where the second address information is used to indicate a storage location of the write instruction.

The data packet may be a transaction layer packet (TLP), the payload data may be a payload carried in the TLP, and the association identifier may be a PCIe address of the TLP or some fields of the PCIe address of the TLP. In other words, the association identifier may be a portal address corresponding to the write instruction or some fields of the portal address. The second address information is all or some fields of an address of a slot for storing the write instruction in the SQ. The NVMe controller maintains a mapping relationship between the first address information and the second address information.

With reference to any one of the first aspect or the foregoing example implementations of the first aspect, in a sixth example implementation of the first aspect, the association identifier includes some fields of the write instruction, and the NVMe controller is further configured to obtain the write instruction based on the association identifier.

For example, if a command identifier of an SQE in each SQ is unique, the association identifier may be "queue ID+command identifier CID"; and if a command identifier CID of each SQE in an entire system is unique, the association identifier may be the command identifier CID of the SQE or some fields of the CID. The NVMe controller may traverse SQs based on association identifiers, to search for a corresponding SQE.

With reference to any one of the foregoing example implementations of the first aspect, in a seventh example implementation of the first aspect, the NVMe controller is further configured to: determine the association identifier based on the write instruction, and obtain the payload data from the allocated storage space based on the association identifier.

The host pushes the data packet, to send the payload data to the NVMe controller. The data may arrive at the NVMe controller before the write instruction. The NVMe controller stores the received data in memory space of the NVMe controller, and records a correspondence between the memory space and the association identifier. After obtaining the write instruction, the NVMe controller may further determine the association identifier based on the write instruction, and search for the stored payload data based on the association identifier.

With reference to any one of the first aspect or the foregoing example implementations of the first aspect, in an eighth example implementation of the first aspect, the NVMe controller is further configured to determine an order of the payload data in the to-be-written data based on an order of receiving data packets.

Because payload data that can be carried in each data packet has a limited size, the host may divide the to-be-written data into a plurality of data packets for transmission. After receiving the data packets, the NVMe controller needs to reorder payload data carried in the data packets. If the host sends the data packets in a strictly order-preserving manner based on an order of the payload data in the to-be-written data, the NVMe controller may order the payload data in an order of receiving the data packets.

With reference to any one of the first aspect or the foregoing example implementations of the first aspect, in a ninth example implementation of the first aspect, the data packet further carries an order identifier, and the order identifier is used to indicate the order of the payload data in the to-be-written data.

The order identifier may be an offset of the payload data in the to-be-written data. When sending the data packet, the host adds the offset of the payload data in the to-be-written data to the data packet. In this way, out-of-order transmission of the data packet can be implemented, and a bandwidth resource can be utilized to a greater extent.

With reference to a second aspect, this embodiment discloses an NVMe-based data writing method, and the method includes: receiving, by an NVMe controller, a data packet from a host, where the data packet carries payload data and an association identifier, and the association identifier is used to associate the payload data with a write instruction; and obtaining, by the NVMe controller, the write instruction, and writing the payload data into a storage medium according to the write instruction.

The write instruction may be further an SQE. The data packet may be further pushed by the host to the NVMe controller. According to the technical solution disclosed in this embodiment, before triggering the SQE, the host does not need to completely prestore to-be-written data in storage space indicated by a PRP or an SGL. In this embodiment, a pipeline operation may be used to reduce a delay caused because the host prepares the to-be-written data, and save storage space used to completely store the to-be-written data. In addition, a PRP field or an SGL field is no longer required in the SQE, thereby reducing bandwidth occupation.

With reference to the second aspect, in a first example implementation of the second aspect, the NVMe controller includes an internal memory, and before the writing, by the NVMe controller, the payload data into the storage medium, the method further includes: allocating, by the NVMe controller, storage space in the internal memory for the payload data, storing the payload data in the allocated storage space, and recording a mapping relationship between the allocated storage space and the association identifier.

The internal storage space may be a private memory of the NVMe controller. The internal storage space is no longer accessed by the host in a PCIe addressing manner, and is not or is not used as a command memory buffer. Before writing the data into the storage medium, the NVMe controller may buffer the data by using the memory storage.

With reference to the first example implementation of the second aspect, in a second example implementation of the second aspect, the NVMe controller organizes the internal memory of the NVMe controller in a memory block form, and the internal memory includes a plurality of memory blocks. The method further includes: providing, by the NVMe controller, the host with a quantity of memory blocks in the internal memory and a size of the memory block.

The NVMe controller may open the quantity of memory blocks in the internal memory of the NVMe controller and the size of the memory block to the host in a form of configuration information, or the like. The host reads the configuration information to obtain the quantity of memory blocks and the size of the memory block, and maintains a counter to determine a quantity of available memory blocks in the NVMe controller. When the counter is 0, the host cannot send the data packet to the NVMe controller any longer. This avoids memory overflow and ensures data security.

With reference to the second example implementation of the second aspect, in a third example implementation of the second aspect, after the writing, by the NVMe controller, the payload data into the storage medium, the method further includes: triggering, by the NVMe controller, a memory block release report, where the memory block release report is used to indicate that the NVMe controller releases a memory block.

The NVMe controller may trigger the memory block release report by using a doorbell. To reduce pressure on the host to process doorbells, the NVMe controller may aggregate a plurality of doorbells. After obtaining the memory block release report, the host increases a value of the counter based on a quantity of memory blocks released by the NVMe controller.

With reference to the third example implementation of the second aspect, in a fourth example implementation of the second aspect, the host maintains a plurality of counters, and each counter corresponds to at least one write instruction.

The memory block release report further includes the association identifier, and the memory release block report is used to indicate that the NVMe controller releases a memory block occupied by a write operation corresponding to the association identifier.

For example, the host may divide write operations into a plurality of levels based on different priorities of the write operations. Each level corresponds to a respective counter, and a counter corresponding to a different level represents a quantity of unoccupied memory blocks available for a write operation at the level. The host determines a level of the released memory block based on the association identifier in the memory block release report, and correspondingly increases a value of a counter at the level. Alternatively, the host may maintain the counter for a single write instruction or SQ. A further implementation of the counter is not limited in the present disclosure.

With reference to any one of the second aspect or the foregoing example implementations of the second aspect, in a fifth example implementation of the second aspect, the data packet is a PCIe packet, the association identifier is first address information of the PCIe packet, and the method further includes: determining, by the NVMe controller, second address information based on the first address information, and obtaining the write instruction based on the second address information, where the second address information is used to indicate a storage location of the write instruction.

The data packet may be a TLP, the payload data may be a payload carried in the TLP, and the association identifier may be a PCIe address of the TLP or all or some fields of the PCIe address of the TLP. The second address information is all or some fields of an address of a slot for storing the write instruction in the SQ. The NVMe controller maintains a mapping relationship between the first address information and the second address information.

With reference to any one of the second aspect or the foregoing example implementations of the second aspect, in a sixth example implementation of the second aspect, the association identifier includes some fields of the write instruction, and the method further includes: obtaining, by the NVMe controller, the write instruction based on the association identifier.

For example, if a command identifier of an SQE in each SQ is unique, the association identifier may be "queue ID+command identifier CID"; and if a command identifier CID of each SQE in an entire system is unique, the association identifier may be the command identifier CID of the SQE or some fields of the CID. The NVMe controller may traverse SQs based on association identifiers, to search for a corresponding SQE.

With reference to any one of the foregoing example implementations of the second aspect, in a seventh example implementation of the second aspect, the method further includes: determining, by the NVMe controller, the association identifier based on the write instruction, and obtaining the payload data from the allocated storage space based on the association identifier.

The host pushes the data packet, to send the payload data to the NVMe controller. The data may arrive at the NVMe controller before the write instruction. The NVMe controller stores the received data in memory space of the NVMe controller, and records a correspondence between the memory space and the association identifier. After obtaining the write instruction, the NVMe controller may further determine the association identifier based on the write instruction, and search for the stored payload data based on the association identifier.

With reference to any one of the second aspect or the foregoing example implementations of the second aspect, in an eighth example implementation of the second aspect, the method further includes: determining, by the NVMe controller, an order of the payload data in the to-be-written data based on an order of receiving data packets.

Because payload data that can be carried in each data packet has a limited size, the host needs to divide the to-be-written data into a plurality of data packets for transmission. After receiving the data packets, the NVMe controller needs to reorder payload data carried in the data packets. If the host sends the data packets in a strictly order-preserving manner based on an order of the payload data in the to-be-written data, the NVMe controller may order the payload data in an order of receiving the data packets.

With reference to any one of the second aspect or the foregoing example implementations of the second aspect, in a ninth example implementation of the second aspect, the data packet further carries an order identifier, and the order identifier is used to indicate the order of the payload data in the to-be-written data.

The order identifier may be an offset of the payload data in the to-be-written data. When sending the data packet, the host adds the offset of the payload data in the to-be-written data to the data packet. In this way, out-of-order transmission can be implemented, and a bandwidth resource can be utilized to a greater extent.

With reference to a third aspect, this embodiment provides a readable medium, including an executable instruction. When a processor of a computing device executes the executable instruction, the computing device performs the method according to any one of the second aspect or the example implementations of the second aspect.

With reference to a fourth aspect, this embodiment provides a computing device, including a processor, a memory, and a bus. The memory is configured to store an executable instruction, the processor is coupled to the memory by using the bus, and when the computing device runs, the processor executes the executable instruction stored in the memory, such that the computing device performs the method according to any one of the second aspect or the example implementations of the second aspect.

With reference to the fifth aspect, this embodiment discloses an NVMe-based data writing method, and the method includes: triggering, by the host, a write instruction, and sending a data packet to an NVMe controller, where the data packet carries payload data and an association identifier, and the association identifier is used to associate the payload data with the write instruction.

The write instruction may be further an SQE. A further procedure in which the host triggers the write instruction may be: The host writes the SQE into an SQ, and notifies the NVMe controller by using a doorbell. That the host sends the data packet to the NVMe controller is further: The host actively pushes the data packet to the NVMe controller. The host actively pushes the data packet to the NVMe controller, and associates the payload data with the write instruction by using the association identifier carried in the data packet, thereby implementing data writing. According to the technical solution disclosed in this embodiment, before triggering the SQE, the host does not need to completely prestore to-be-written data in storage space indicated by a PRP or an SGL. In this embodiment, a pipeline operation may be used to reduce a delay caused because the host prepares the to-be-written data, and save storage space used to completely store the to-be-written data. In addition, a PRP field or an SGL field is no longer required in the SQE, thereby reducing bandwidth occupation.

With reference to the fifth aspect, in a first example implementation of the fifth aspect, the data packet is a PCIe packet, the association identifier is first address information of the PCIe packet, there is a mapping relationship between the first address information and second address information, and the second address information is used to indicate a storage location of the write instruction.

The data packet may be a TLP, the payload data may be a payload carried in the TLP, and the association identifier may be a PCIe address of the TLP or all or some fields of the PCIe address of the TLP. The second address information is all or some fields of an address of a slot for storing the write instruction in the SQ. The NVMe controller maintains a mapping relationship between the first address information and the second address information.

With reference to the fifth aspect, in a second example implementation of the fifth aspect, the association identifier includes some fields of the write instruction, and the association identifier is used to uniquely determine the write instruction.

For example, if a command identifier of an SQE in each SQ is unique, the association identifier may be "queue ID+command identifier CID"; and if a command identifier CID of each SQE in an entire system is unique, the association identifier may be the command identifier CID of the SQE or some fields of the CID. The NVMe controller may traverse SQs based on association identifiers, to search for a corresponding SQE.

With reference to any one of the fifth aspect or the foregoing example implementations of the fifth aspect, in a third example implementation manner of the fifth aspect, the method further includes: obtaining, by the host, a quantity of memory blocks in an internal memory of the NVMe controller and a size of the memory block, where the memory block is configured to store data from the host.

The NVMe controller organizes the internal memory of the NVMe controller in a memory block form. The internal memory includes a plurality of memory blocks. The NVMe controller may open the quantity of memory blocks in the internal memory of the NVMe controller and the size of the memory block to the host in a form of configuration information, or the like. The host reads the configuration information to obtain the quantity of memory blocks and the size of the memory block.

With reference to the third example implementation of the fifth aspect, in a fourth example implementation of the fifth aspect, the host further includes a counter, and the counter is configured to indicate a quantity of unoccupied memory blocks in the memory storage of the NVMe controller. After the host sends the data packet to the NVMe controller, the method further includes: reducing, by the host, a value of the counter.

The host maintains the counter to determine a quantity of available memory blocks of the host. When the counter is 0, the host cannot send the data packet to the NVMe controller any longer. This avoids memory overflow and ensures data security.

With reference to the fourth example implementation of the fifth aspect, in a fifth example implementation of the fifth aspect, the method further includes: obtaining, by the host, a memory block release report triggered by the NVMe controller, where the memory block release report is used to indicate that the NVMe controller releases a memory block; and increasing, by the host, the value of the counter based on the memory block release report.

The NVMe controller may trigger the memory block release report by using a doorbell. To reduce pressure on the host to process doorbells, the NVMe controller may aggregate a plurality of doorbells. After obtaining the memory block release report, the host increases the value of the counter based on a quantity of memory blocks released by the NVMe controller.

With reference to the fifth example implementation of the fifth aspect, in a sixth example implementation of the fifth aspect, the host includes a plurality of counters, and each counter corresponds to at least one write instruction. The memory block release report further includes the association identifier, and the method further includes: increasing, by the host based on the memory block release report and the association identifier, a value of a counter corresponding to the write instruction.

For example, the host may divide write operations into a plurality of levels based on different priorities of the write operations. Each level corresponds to a respective counter, and a counter corresponding to a different level represents a quantity of unoccupied memory blocks available for a write operation at the level. The host determines a level of the released memory block based on the association identifier in the memory block release report, and correspondingly increases a value of a counter at the level. Alternatively, the host may maintain the counter for a single write instruction or SQ. A further implementation of the counter is not limited in the present disclosure.

With reference to a sixth aspect, this embodiment provides a readable medium, including an executable instruction. When a processor of a computing device executes the executable instruction, the computing device performs the method according to any one of the fifth aspect or the example implementations of the fifth aspect.

With reference to a seventh aspect, this embodiment provides a computing device, including a processor, a memory, and a bus. The memory is configured to store an executable instruction, the processor is coupled to the memory by using the bus, and when the computing device runs, the processor executes the executable instruction stored in the memory, such that the computing device performs the method according to any one of the fifth aspect or the example implementations of the fifth aspect.

With reference to an eighth aspect, this embodiment discloses an NVMe-based data writing apparatus, and the apparatus includes: a receiving unit, configured to receive a data packet from a host, where the data packet carries payload data and an association identifier, and the association identifier is used to associate the payload data with a write instruction; and a processing unit, configured to: obtain the write instruction, and write the payload data into a storage medium according to the write instruction.

With reference to the eighth aspect, in a first example implementation of the eighth aspect, the apparatus further includes an internal memory, and before writing the payload data into the storage medium, the processing unit is further configured to: allocate storage space in the internal memory for the payload data, store the payload data in the allocated storage space, and record a mapping relationship between the allocated storage space and the association identifier.

With reference to the first example implementation of the eighth aspect, in a second example implementation of the eighth aspect, the internal memory includes a plurality of memory blocks, and the processing unit is further configured to provide the host with a quantity of memory blocks in the internal memory and a size of the memory block.

With reference to the second example implementation of the eighth aspect, in a third example implementation of the eighth aspect, after writing the payload data into the storage medium, the processing unit is further configured to trigger a memory block release report, where the memory block release report is used to indicate that the apparatus releases a memory block.

With reference to the third example implementation of the eighth aspect, in a fourth example implementation of the eighth aspect, the memory block release report further includes the association identifier, and the memory block release report is used to indicate that the apparatus releases a memory block occupied by a write operation corresponding to the association identifier.

With reference to any one of the eighth aspect or the foregoing example implementations of the eighth aspect, in a fifth example implementation of the eighth aspect, the data packet is a PCIe packet, the association identifier is first address information of the PCIe packet, and the processing unit is further configured to: determine second address information based on the first address information, and obtain the write instruction based on the second address information, where the second address information is used to indicate a storage location of the write instruction.

With reference to any one of the eighth aspect or the foregoing example implementations of the eighth aspect, in a sixth example implementation of the eighth aspect, the association identifier includes some fields of the write instruction, and the processing unit is further configured to obtain the write instruction based on the association identifier.

With reference to any one of the foregoing example implementations of the eighth aspect, in a seventh example implementation of the eighth aspect, the processing unit is further configured to: determine the association identifier based on the write instruction, and obtain the payload data from the allocated storage space based on the association identifier.

With reference to any one of the eighth aspect or the foregoing example implementations of the eighth aspect, in an eighth example implementation of the eighth aspect, the processing unit is further configured to determine an order of the payload data in to-be-written data based on an order of receiving data packets.

With reference to any one of the eighth aspect or the foregoing example implementations of the eighth aspect, in a ninth example implementation of the eighth aspect, the data packet further carries an order identifier, and the order identifier is used to indicate the order of the payload data in the to-be-written data.

The eighth aspect is an implementation of an apparatus corresponding to the method in the second aspect. Therefore, the descriptions in any one of the second aspect or the example implementations of the second aspect are correspondingly applicable to any one of the eighth aspect or the example implementations of the eighth aspect. Details are not described herein again.

With reference to a ninth aspect, this embodiment discloses an NVMe-based data writing apparatus, and the apparatus includes: a processing unit, configured to: trigger a write instruction, and send a data packet to an NVMe controller, where the data packet carries payload data and an association identifier, and the association identifier is used to associate the payload data with the write instruction.

With reference to the ninth aspect, in a first example implementation of the ninth aspect, the data packet is a PCIe packet, the association identifier is first address information of the PCIe packet, there is a mapping relationship between the first address information and second address information, and the second address information is used to indicate a storage location of the write instruction.

With reference to the ninth aspect, in a second example implementation of the ninth aspect, the association identifier includes some fields of the write instruction, and the association identifier is used to uniquely determine the write instruction.

With reference to any one of the ninth aspect or the foregoing example implementations of the ninth aspect, in a third example implementation of the ninth aspect, the processing unit is further configured to obtain a quantity of memory blocks in an internal memory of the NVMe controller and a size of the memory block, where the memory block is configured to store data from the apparatus.

With reference to the third example implementation of the ninth aspect, in a fourth example implementation of the ninth aspect, the apparatus further includes a counter, the counter is configured to indicate a quantity of unoccupied memory blocks in the memory storage of the NVMe controller, and after sending the data packet to the NVMe controller, the processing unit is further configured to reduce a value of the counter.

With reference to the fourth example implementation of the ninth aspect, in a fifth example implementation of the ninth aspect, the processing unit is further configured to: obtain a memory block release report triggered by the NVMe controller, and increase a value of the counter based on the memory block release report, where the memory block release report is used to indicate that the NVMe controller releases a memory block.

With reference to the fifth example implementation of the ninth aspect, in a sixth example implementation of the ninth aspect, the apparatus includes a plurality of counters, and each counter corresponds to at least one write instruction. The memory block release report further includes the association identifier, and the processing unit is configured to increase, based on the memory block release report and the association identifier, a value of a counter corresponding to the write instruction.

The ninth aspect is an implementation of an apparatus corresponding to the method in the fifth aspect. Therefore, the descriptions in any one of the fifth aspect or the example implementations of the fifth aspect are correspondingly applicable to any one of the ninth aspect or the example implementations of the ninth aspect. Details are not described herein again.

With reference to the technical solutions disclosed in the embodiments of the present disclosure, when performing an NVMe-based write operation, the host actively pushes the to-be-written data to the NVMe controller in a data packet form, and adds the association identifier to the packet, to associate the to-be-written data with the write instruction SQE. The SQE does not need to carry data storage location information, and the host no longer needs to completely prepare data before sending the SQE, thereby reducing a delay of the write operation, and reducing storage space for storing the to-be-written data by the host. In addition, the SQE may no longer carry address information of the to-be-written data, thereby reducing bus load.

BRIEF DESCRIPTION OF DRAWINGS

FIG. 5 is a schematic flowchart of an NVMe-based data writing method according to an embodiment;

FIG. 6 is a schematic diagram of a portal organization structure according to an embodiment of the present disclosure;

DESCRIPTION OF EMBODIMENTS

Figure 1:
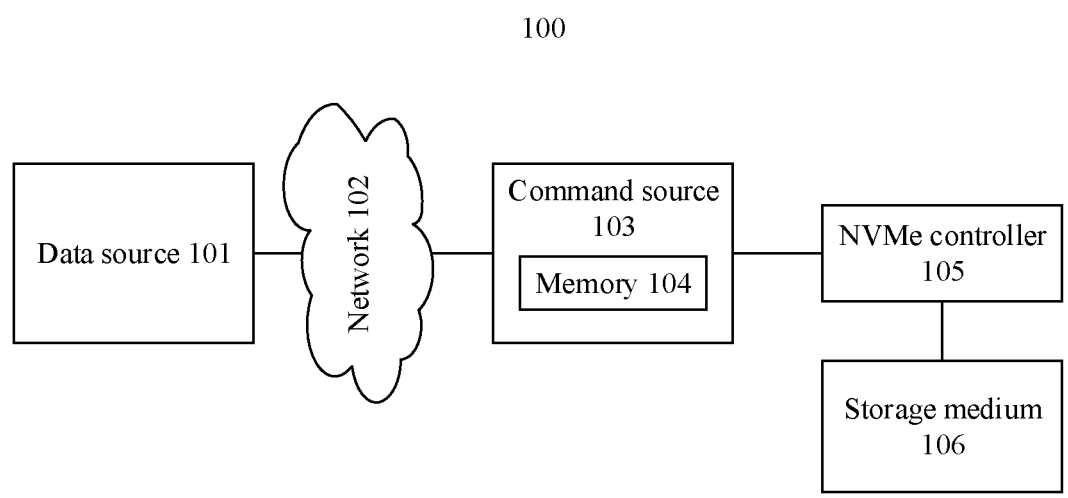
FIG. 1 is a schematic diagram of a logical structure of an NVMe system according to an embodiment.

The following describes embodiments of the present disclosure with reference to the accompanying drawings.

In the embodiments of the present disclosure, terms such as "first" and "second" are used to distinguish between objects such as a first address and a second address, but there is no logical or time-sequential dependency relationship between "first" and "second".

In the embodiments of the present disclosure, a "data packet" is a packet that is from a host to an NVMe controller and that carries payload data, and the payload data belongs to to-be-written data. The to-be-written data herein may be user data or metadata of user data. A type of data carried in the data packet is not limited in the embodiments of the present disclosure. In the following descriptions, unless otherwise specified, in the embodiments of the present disclosure, the term "data" is used to represent various types of data carried in the data packet.

In the embodiments of the present disclosure, the term "push" means that the host actively sends the data packet to the NVMe controller.

In the embodiments of the present disclosure, a portal is address space opened by the NVMe controller to the host, a portal address may be further a PCIe address, and the data packet may be a PCIe write packet. The host pushes the data packet to the NVMe controller through the portal, and the data packet carries the portal address. After receiving the data packet, the NVMe controller identifies the portal address, allocates corresponding storage space in a local internal memory for the portal address, and writes payload data carried in the data packet into the allocated storage space for buffering, instead of writing the payload data into storage space indicated by the portal address. The internal memory may be further private memory space of the NVMe controller.

In the embodiments of the present disclosure, an association identifier carried in the data packet is used to associate the payload data with a write instruction. The association identifier may be further the portal address or some fields of the portal address.

In the embodiments of the present disclosure, a write operation may be any operation, in the NVMe command set, in which the host transmits data to the NVMe controller. An instruction indicating the write operation is a write instruction. A further implementation of the write instruction may be an SQE.

In the embodiments of the present disclosure, a command initiator is a system body that directly submits a to-be-executed instruction to the NVMe controller, and is also referred to as a command source in the embodiments of the present disclosure. A data initiator is a system body that generates data and initiates data transmission, and is also referred to as a data source in the embodiments of the present disclosure. In the embodiments of the present disclosure, the command initiator and the data initiator may be a same body or bodies that are separated from each other. The term "host" may be a command source in a scenario in which the data source and the command source are separated, or a computing device that communicates with the NVMe controller in a scenario in which the data source and the command source are not separated.

In a conventional manner, when an NVMe write operation is performed, a write instruction carries address information of to-be-written data by using a PRP or an SGL. After obtaining the write instruction, the NVMe controller obtains the to-be-written data based on the address information, and then writes the to-be-written data into a storage medium. Based on the foregoing mechanism, before triggering the write instruction, the host needs to prestore data in a storage area accessible to a controller. To be further, in the technology, the write instruction can be triggered to a submission queue only after all data corresponding to the write command is stored in a storage area that can be addressed by the controller.

FIG. 1 is an architectural diagram of an NVMe system 100 according to an embodiment of the present disclosure. As shown in FIG. 1, a data source 101 and a command source 103 in the system 100 are not a same body, are separated from each other, and are intercoupled by using a network 102. The command source 103 may be intercoupled to the NVMe controller 105 by using a PCIe bus. The NVMe controller 105 is coupled to a storage medium 106.

In this embodiment of the present disclosure, the storage medium 106 is usually a non-volatile storage medium, and is configured to store data permanently. The storage medium 106 may be a magnetic medium (for example, a floppy disk, a hard disk, or a magnetic tape), an optical medium (for example, a compact disc), a semiconductor medium (for example, a flash memory), or the like. A further implementation form of the storage medium 106 is not limited in this embodiment of the present disclosure. In some embodiments, the storage medium 106 may further include a remote memory separated from the NVMe controller 105, for example, a storage medium intercoupled to the NVMe controller 105 by using a network.

In this embodiment of the present disclosure, the network 102 may be used to represent any manner or interconnect protocol for interconnection between the data source 101 and the command source 103, for example, may be a PCIe bus, an internal interconnect bus of a computer device, the Internet, an intranet, a local area network (LAN), a wide area network (WAN), a storage area network (SAN), or any combination of the foregoing networks. A further implementation form of the network 102 is not limited in this embodiment of the present disclosure.

In the system 100, the data source 101 needs to communicate with the NVMe controller 105 via the command source 103. Based on an existing NVMe standard, a write instruction triggered by the command source 103 needs to carry address information of to-be-written data. When a write operation is performed, the command source 103 can trigger the write instruction only after the data source 101 completely transfers the to-be-written data from the data source 101 to the command source 103, and then the to-be-written data is stored in storage space that can be accessed by the NVMe controller 105 in a PCIe addressing manner.

Figure 2:
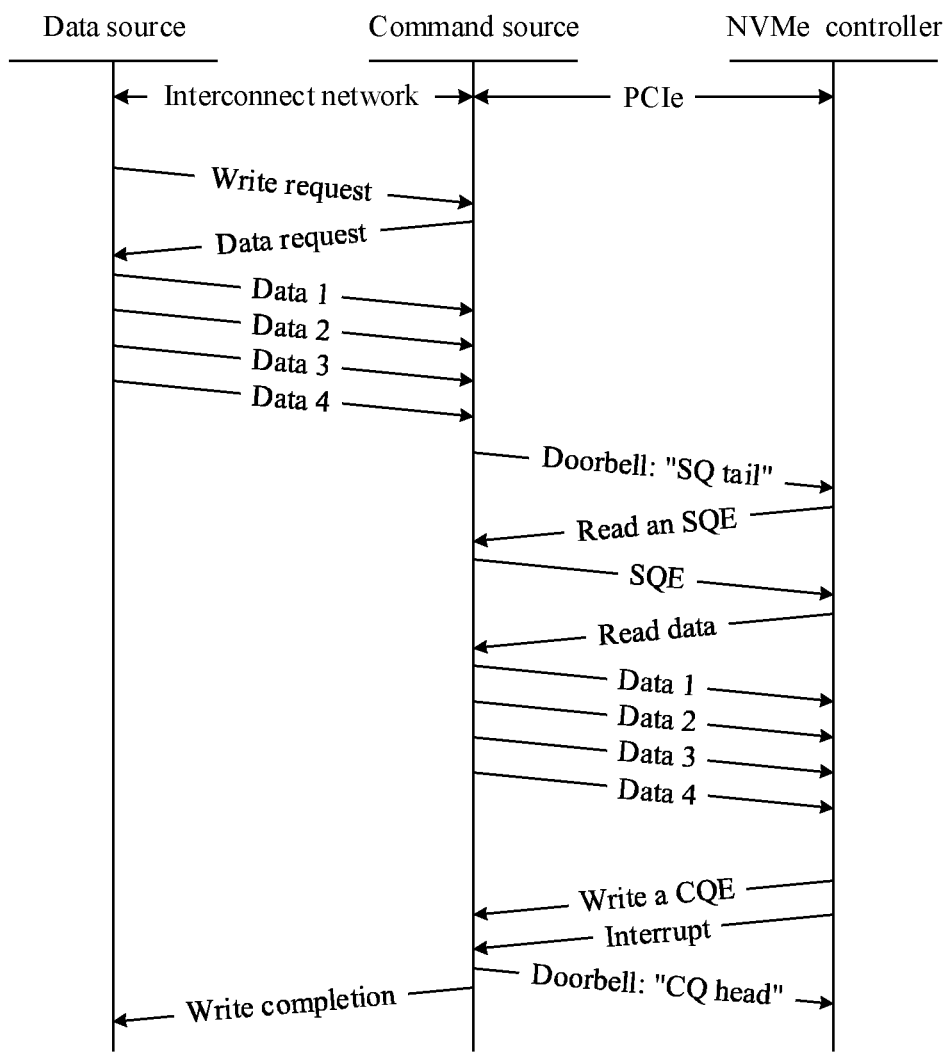
FIG. 2 is a signaling diagram of an NVMe-based data writing method.

Further, as shown in FIG. 2, based on the conventional manner, when a data source needs to write data into a storage medium, the data source first sends a write request to a command source, and transfers to-be-written data to the command source based on a feedback signal. After the to-be-written data is completely stored in storage space that can be addressed by an NVMe controller, the command source writes an SQE into a submission queue. A PRP field or an SGL field of the SQE carries address information of the to-be-written data. Then, the command source notifies, by using a doorbell mechanism, the NVMe controller that there is a new SQE. After receiving a doorbell, the NVMe controller reads the SQE from an SQ, reads, based on the address information carried in the SQE, the to-be-written data by using a PCIe read instruction, and then writes the to-be-written data into the storage medium. After a write operation is completed, the NVMe controller writes a completion queue entry into a completion queue, and notifies the command source by using an interrupt mechanism. The command source processes an interrupt, obtains the CQE, and feeds back write completion to the data source.

It can be learned from FIG. 2 that, before initiating the write instruction, the command source needs to completely transfer the to-be-written data from the data source to address space that can be addressed by the NVMe controller. A delay of this process is directly proportional to a size of the to-be-written data. In addition, the command source requires a large amount of storage space to store the to-be-written data, and the write operation occupies the storage space throughout a time period from a time at which the command source allocates the storage space for the to-be-written data to a time at which the storage space is released when the command source obtains the CQE in the NVMe controller.

Figure 3:
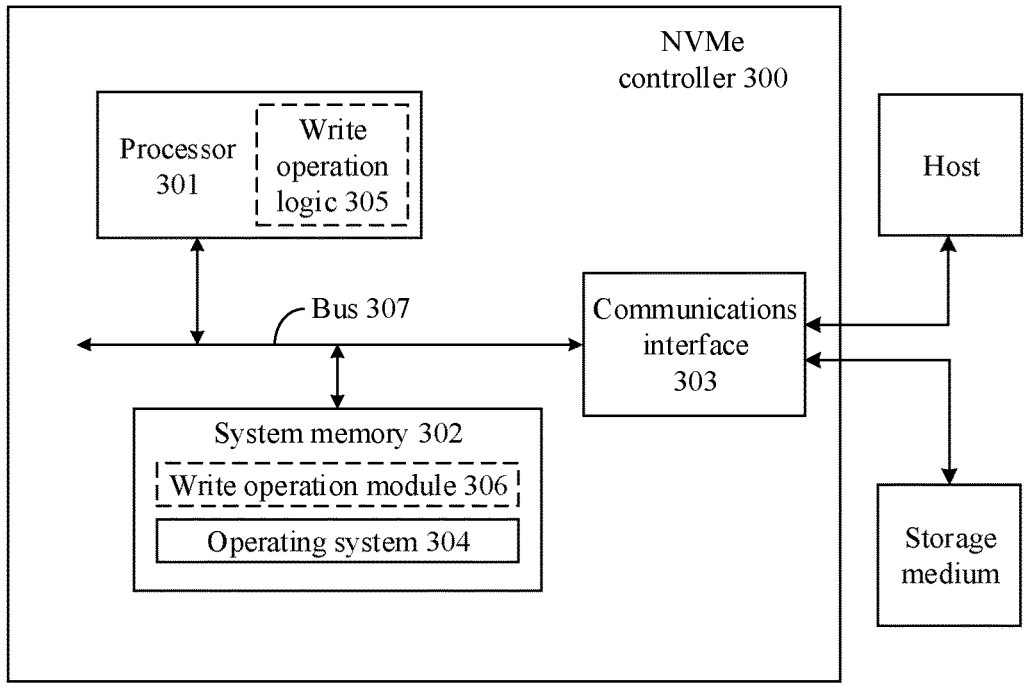
FIG. 3 is a schematic diagram of a hardware structure of an NVMe controller according to an embodiment.

FIG. 3 is a schematic structural diagram of an NVMe controller 300 according to an embodiment.

As shown in FIG. 3, the NVMe controller 300 includes a processor 301, and the processor 301 is coupled to a system memory 302. The processor 301 may be computing logic such as a central processing unit (CPU), a graphics processing unit (GPU), a field programmable gate array (FPGA), an application-specific integrated circuit (ASIC), or a digital signal processor (DSP), or any combination of the foregoing computing logic. The processor 301 may be a single-core processor or a multi-core processor.

In this embodiment of the present disclosure, the processor 301 may further internally include a register, and the register may be open to a host for access. More further, the register may be open to the host as PCIe address space, such that the host accesses the register by using a PCIe address.

In an embodiment, the processor 301 may further include write operation logic 305. The write operation logic 305 may be a further hardware circuit or a firmware module integrated in the processor 301. If the write operation logic 305 is a further hardware circuit, the write operation logic 305 performs a method in the embodiments. If the write operation logic 305 is a firmware module, the processor 301 executes firmware code in the write operation logic 305 to implement a technical solution in the embodiments. The write operation logic 305 includes: (1) logic (circuit/firmware code) that is used to receive a data packet from the host, where the data packet carries payload data and an association identifier, and the association identifier is used to associate the payload data with a write instruction; (2) logic (circuit/firmware code) that is used to obtain the write instruction; and (3) logic (circuit/firmware code) that is used to write the payload data into a storage medium according to the write instruction.

A bus 307 is configured to transfer information between components of the NVMe controller 300. The bus 307 may use a wired connection manner or a wireless connection manner. This is not limited in this embodiment. The bus 307 may be further coupled to a communications interface 303.

The communications interface 303 is configured to implement communication with another device or network. The communications interface 303 may be intercoupled to another device or network in a wired or wireless manner. For example, the NVMe controller 300 is intercoupled to the host and the storage medium by using the communications interface 303. Alternatively, the NVMe controller 300 may be coupled to the network by using the communications interface 303, and may be intercoupled to the host or the storage medium by using the network.

In this embodiment, some features may be implemented/supported by the processor 301 by executing software code in the system memory 302. The system memory 302 may include some software, for example, an operating system 304 (such as Darwin, RTXC, Linux, Unix, OS X, WINDOWS, macOS, or an embedded operating system (such as VxWorks)) and a write operation module 306.

In an embodiment, the processor 301 executes the write operation module 306 to implement the technical solution in the embodiments. The write operation module 306 includes: (1) code that is used to receive a data packet from the host, where the data packet carries payload data and an association identifier, and the association identifier is used to associate the payload data with a write instruction; (2) code that is used to obtain a command log of the write instruction, and store a command log of a write transaction; and (3) code that is used to write the payload data into a storage medium according to the write instruction.

In addition, FIG. 3 shows merely an example of the NVMe controller 300. The NVMe controller 300 may include more or fewer components than those shown in FIG. 3, or may have different component configurations. In addition, each component shown in FIG. 3 may be implemented by hardware, software, or a combination of hardware and software.

Figure 4:
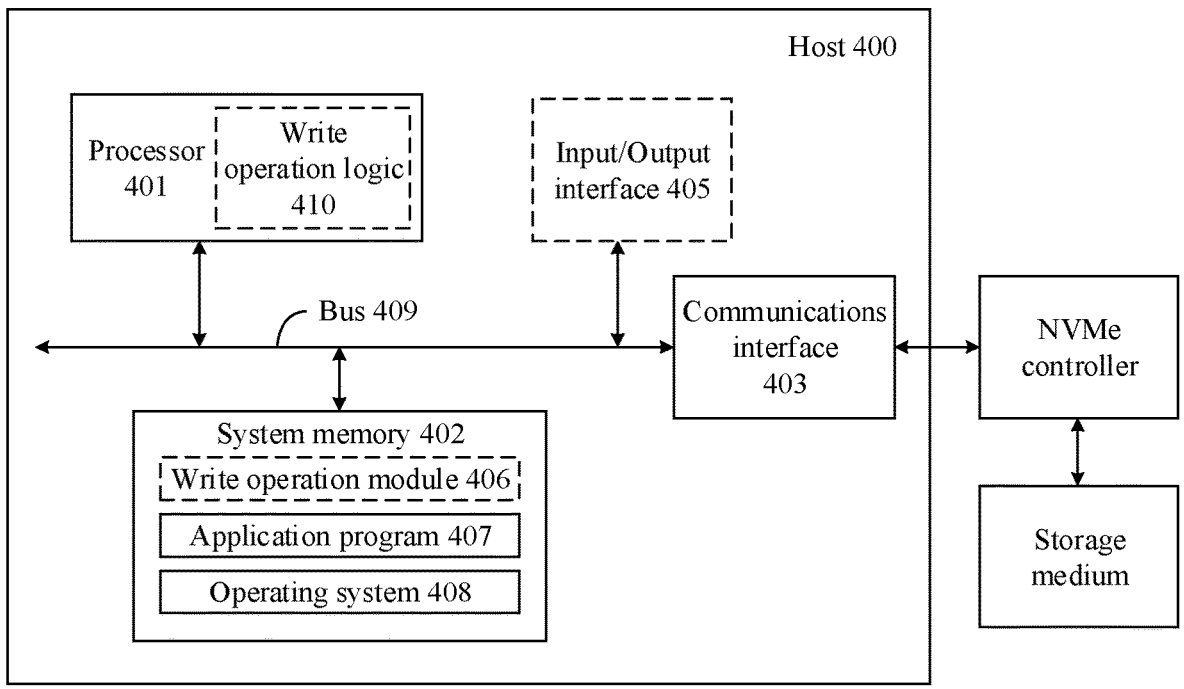
FIG. 4 is a schematic diagram of a hardware structure of a host according to an embodiment.

FIG. 4 is a schematic structural diagram of a host 400 according to an embodiment.

As shown in FIG. 4, the host 400 includes a processor 401, and the processor 401 is coupled to a system memory 402. The processor 401 may be computing logic such as a CPU, a GPU, an FPGA, an ASIC, or a DSP, or any combination of the foregoing computing logic. The processor 401 may be a single-core processor or a multi-core processor.

In an embodiment, the processor 401 may further include write operation logic 410. The write operation logic 410 may be a further hardware circuit or a firmware module integrated in the processor 401. If the write operation logic 410 is a further hardware circuit, the write operation logic 410 performs a method in the embodiments. If the write operation logic 410 is a firmware module, the processor 410 executes firmware code in the write operation logic 410 to implement a technical solution in the embodiments. The write operation logic 410 includes: (1) logic (circuit/firmware code) that is used to trigger a write instruction; and (2) logic (circuit/firmware code) that is used to send a data packet to an NVMe controller, where the data packet carries payload data and an association identifier, and the association identifier is used to associate the payload data and the write instruction.

A bus 409 is configured to transfer information between components of the host 400. The bus 409 may use a wired connection manner or a wireless connection manner. This is not limited in this application. The bus 409 is further coupled to an input/output interface 405 and a communications interface 403.

The input/output interface 405 is coupled to an input/output device, and is configured to: receive input information and output an operation result. The input/output device may be a mouse, a keyboard, a display, a CD-ROM drive, or the like.

The communications interface 403 is configured to implement communication with another device or network. The communications interface 403 may be intercoupled to another device or network in a wired or wireless manner. For example, the host 400 may be intercoupled to the NVMe controller by using the communications interface 403, or the host 400 may be intercoupled to the network by using the communications interface 403, and is connected to the NVMe controller by using the network.

In this embodiment, some features may be implemented/supported by the processor 401 by executing software code in the system memory 402. The system memory 402 may include some software, for example, an operating system 408 (such as Darwin, RTXC, Linux, Unix, OS X, Windows, or an embedded operating system (such as Vxworks)), an application program 407, and a write operation module 406.

In an embodiment, the processor 401 executes the write operation module 406 to implement the technical solution in the embodiments. The write operation module 406 includes: (1) code that is used to trigger a write instruction; and (2) code that is used to send a data packet to the NVMe controller, where the data packet carries payload data and an association identifier, and the association identifier is used to associate the data packet and the write instruction.

In addition, FIG. 4 shows merely an example of the host 400. The host 400 may include more or fewer components than those shown in FIG. 4, or may have different component configurations. In addition, each component shown in FIG. 4 may be implemented by hardware, software, or a combination of hardware and software.

To reduce a delay of a write instruction and save memory space occupied by a write operation, an embodiment of the present disclosure provides an NVMe-based data writing method. As shown in FIG. 5, a method 500 includes the following steps.

Step 501: An NVMe controller receives a data packet from a host, where the data packet carries payload data and an association identifier.

That the host sends the data packet to the NVMe controller may be further: The host actively pushes the data packet to the NVMe controller. The payload data belongs to to-be-written data. Because the payload data carried in the data packet has a limited size, the host may divide the to-be-written data into a plurality of data packets and push the plurality of data packets to the NVMe controller.

The association identifier carried in the data packet is used to associate the data packet with a write instruction. More further, the association identifier is used to associate the payload data in the data packet with a write instruction corresponding to the payload data. The write instruction is the write instruction corresponding to the payload data carried in the data packet.

A further implementation of the association identifier is not limited in this embodiment of the present disclosure. The association identifier may be further used to indicate the write instruction corresponding to the payload data. The association identifier may directly or indirectly indicate the write instruction corresponding to the payload data carried in the data packet.

In a conventional manner, the host indicates address information of to-be-written data by using a PRP field or an SGL field of an SQE, and the NVMe controller reads the to-be-written data based on the address information by performing a PCIe read operation. In this embodiment of the present disclosure, the host directly pushes the data packet to the NVMe controller, and the data packet carries the payload data.

In this embodiment of the present disclosure, the data packet may be a PCIe write operation packet. More further, the data packet may be a transaction layer packet, the payload data may be a payload carried in the TLP, and the association identifier may be a PCIe address of the TLP or some fields of the PCIe address.

Step 502: The NVMe controller obtains the write instruction.

In this embodiment of the present disclosure, the write instruction may be further an SQE. In the following description, for example, the write instruction is an SQE. However, it should be understood that a further implementation form of the write instruction is not limited in this embodiment of the present disclosure.

In this embodiment of the present disclosure, for a procedure in which the host triggers the write instruction to the NVMe controller, refer to an NVMe standard. Further, the host writes the SQE into an SQ, and notifies, by using a doorbell, the NVMe controller that there is a new SQE. The NVMe controller obtains the SQE from the SQ based on the doorbell. A further procedure in which the host triggers the write instruction to the NVMe controller is not limited in this embodiment of the present disclosure. For example, the host may further directly push the SQE to the NVMe controller.

A format of the SQE in this embodiment of the present disclosure may be consistent with that specified in the NVMe standard. However, in this embodiment of the present disclosure, the payload data and the write instruction are associated by using the association identifier, and the data packet is actively pushed by the host to the NVMe controller. The NVMe controller no longer needs to actively obtain the payload data by performing a PCIe read operation. Therefore, the SQE does not need to carry the address information of the to-be-written data by using an SGL domain or a PRP domain. The NVMe controller may process the SGL field or the PRP field of the SQE depending on an association method of the SQE and data. If the SGL field or the PRP field does not carry other information in further implementation, a method for processing the SGL field or the PRP field by the NVMe controller may be "ignoring". In other words, an SGL or a PRP may be omitted in this embodiment of the present disclosure.

Step 503: The NVMe controller writes the payload data into a storage medium according to the write instruction.

In this embodiment of the present disclosure, the NVMe controller associates the payload data with the write instruction by using the association identifier carried in the data packet. After obtaining the data packet and the write instruction, the NVMe controller writes the payload data into the storage medium according to the write instruction. The storage medium herein is usually a non-volatile storage medium.

In this embodiment of the present disclosure, the data packet may be further a PCIe write packet. That the host pushes the data packet to the NVMe controller may be: The host writes the payload data into the NVMe controller by using the PCIe write packet.

In this embodiment of the present disclosure, the NVMe controller opens a part of storage space of the NVMe controller to the host. More further, the open storage space may be used as PCIe address space of the host, and the host accesses, by using a PCIe address, the part of address space open to the host. A base address register is used as an example for description. The NVM controller may organize some of PCIe addresses of the base address register in a form of a plurality of portals, and each portal occupies PCIe address space that can be addressed by a further host. The portal is a data portal through which the host performs a PCIe write operation for the NVMe controller. In the following description, a function of the portal is described with more details. The data packet pushed by the host to the NVMe controller is a PCIe write packet. The host writes data associated with the write command to the NVMe controller through the portal. An address segment of the PCIe write packet indicates a portal corresponding to the write operation. To be further, a portal address may be a PCIe address in the data packet or some fields of the PCIe address.

The association identifier may be the portal address or some fields of the portal address. An organization manner of a portal in the PCIe address space is not limited in the present disclosure, provided that each portal uniquely corresponds to a further write operation. Each portal is uniquely associated with a further write operation. "Unique" means that the host can initiate only one NVMe write operation at any moment and associate the NVMe write operation with a further portal.

The NVMe controller may organize some of the PCIe addresses of the base address register in a form of an aperture. Each aperture includes a plurality of portals. To be further, the portal may be organized in a form of an array, and the portal is addressed by using an array base address plus a portal offset. This array is referred to as an aperture. FIG. 6 is a schematic structural diagram of a base address register. As shown in FIG. 6, each aperture includes a group of portals P0 to PN.

Figure 7:
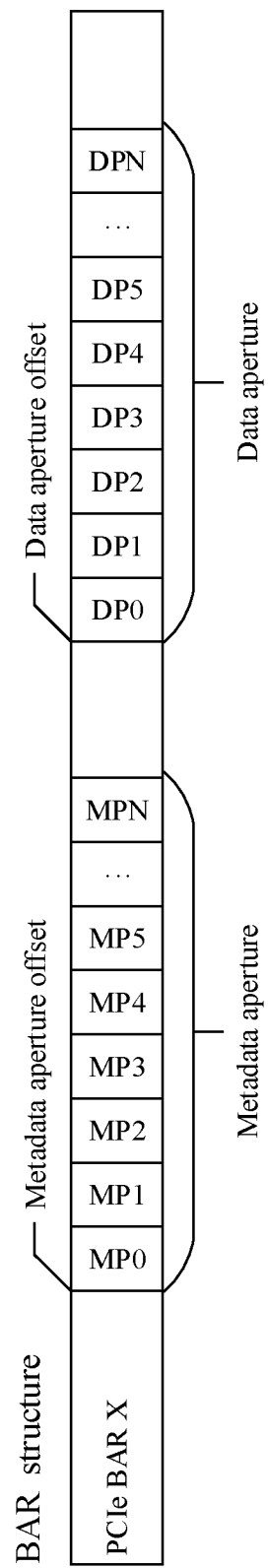
FIG. 7 is a schematic diagram of a portal organization structure according to an embodiment of the present disclosure.

More further, as shown in FIG. 7, in this embodiment of the present disclosure, there may be a metadata aperture and a data aperture. The host pushes, by using a PCIe write operation, data to portals DP0 to DPN included in the data aperture, and pushes metadata to portals MP0 to MPN included in the metadata aperture. For ease of description, in the following description, unless otherwise specified, the metadata and the data are collectively referred to as data in this embodiment of the present disclosure.

In this embodiment of the present disclosure, the association identifier may be used to indicate a further portal. For example, the association identifier may be address information of a further portal. The NVMe controller maintains a correspondence between a portal and an SQE, and may uniquely determine a portal based on the association identifier, to determine the SQE associated with the portal.

Figure 8:
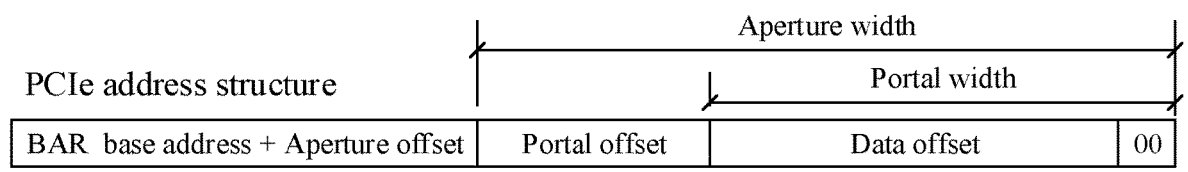
FIG. 8 is a schematic diagram of a PCIe address structure according to an embodiment of the present disclosure.

FIG. 8 shows a PCIe address structure in a PCIe data packet according to an embodiment of the present disclosure. As shown in FIG. 8, the PCIe address structure includes a BAR base address, an aperture offset, and a portal offset. The BAR and the aperture offset are used to uniquely determine an aperture, and the portal offset is used to indicate a further portal of the aperture.

In this embodiment of the present disclosure, portals may be randomly distributed in PCIe address space, and the portals randomly distributed in the PCIe space are referred to as any "data portals" or "metadata portals".

In this embodiment of the present disclosure, data is "pushed" by a host to an NVMe controller through an aperture in PCIe BAR space. "Push" refers to a PCIe write transaction initiated by the host. Data associated with an NVMe write instruction is written into the NVMe controller through a portal.

In this embodiment of the present disclosure, the portal is used to receive a data packet, and is a portal for performing a PCIe write operation by the host for the NVMe controller. However, after the NVMe controller receives the data packet, a memory configured to store data in the data packet may be an internal memory of the NVMe controller, and the payload data is not stored in storage space indicated by a portal address. The NVMe controller allocates a further memory block in the internal memory of the NVMe controller for each portal, to store the data carried in the data packet received through the portal. To facilitate data management and query, the NVMe controller may establish a mapping relationship between a memory block and a portal, and after receiving a data packet, store payload data in a corresponding memory block based on an indication of an association identifier.

The internal memory that is of the NVMe controller and that is configured to store data may no longer be accessed by the host in a PCIe addressing manner, and is not or is not used as a command memory buffer. A further implementation of a memory that is configured to store data is not limited in this embodiment of the present disclosure.

Figure 9:
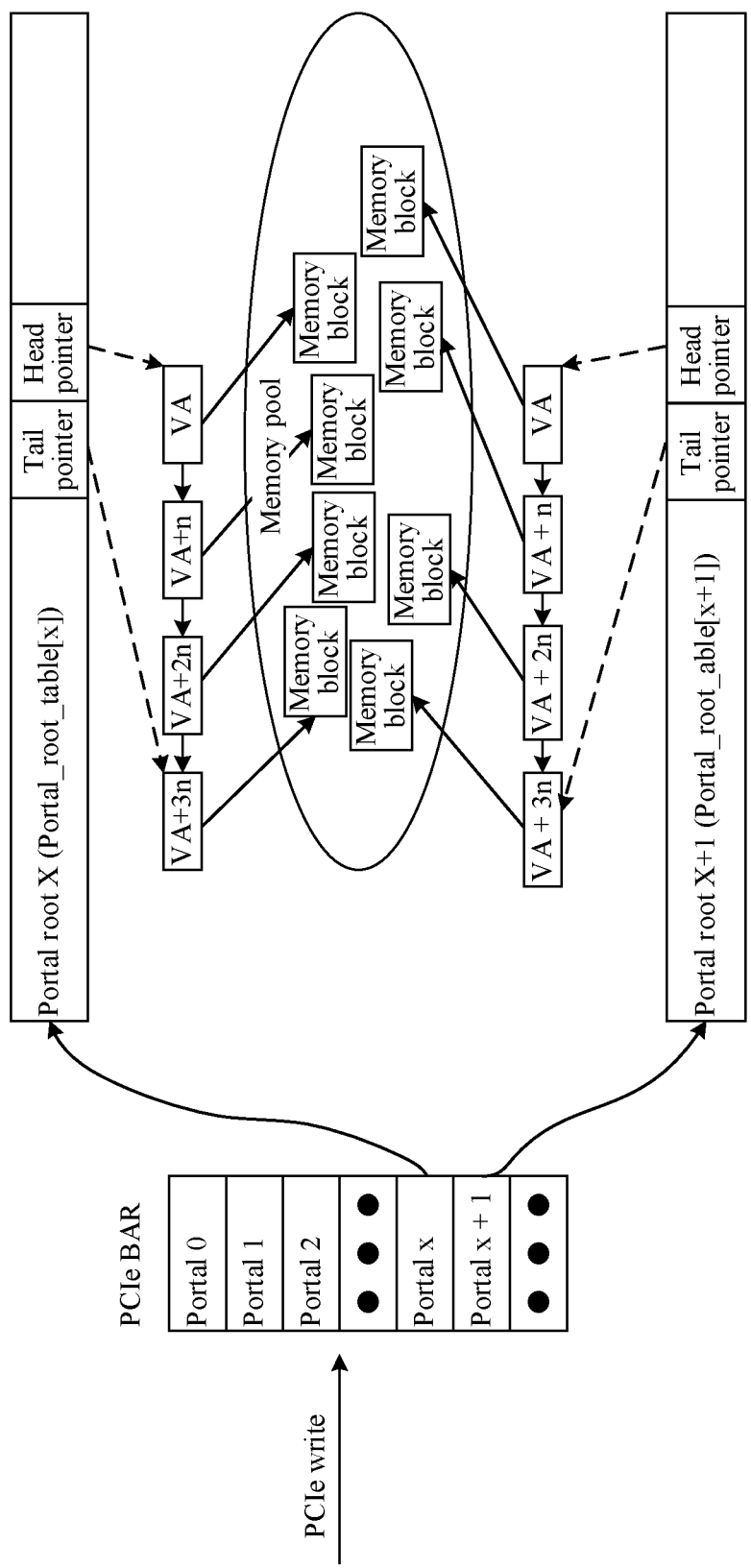
FIG. 9 is a schematic diagram of a data storage structure according to an embodiment of the present disclosure.

Optionally, the NVMe controller may organize, by using a root data structure, data received through a portal. As shown in FIG. 9, after receiving a data packet, the NVMe controller may organize the data in the root data structure, so as to facilitate data management.

In this embodiment of the present disclosure, after receiving the data packet, the NVMe controller decodes an address of the data packet, identifies the association identifier, identifies the portal and the root data structure based on the association identifier, allocates a free memory block in the memory storage for the data, stores the data in the allocated memory block, and attaches the memory block to the root data structure. The NVMe controller first stores the data in the internal memory of the NVMe controller. When a particular condition is met, the NVMe controller stores, in a storage medium, the data stored in the internal memory of the NVMe controller. The condition met herein may be that the NVMe controller receives a corresponding write instruction or that a particular amount of accumulated data reaches such that the NVMe controller can perform one write operation for the storage medium. The internal memory of the NVMe controller may be a private memory of the NVMe controller.

In this embodiment of the present disclosure, if the portals are organized in a form of an array, that is, the portals are consecutive, portal offsets may be set to values ranging from 0 to MSP−1 in ascending order. MSP represents a maximum quantity of portals supported by the aperture. A data offset varies depending on further implementations. Details are described below. The host uniquely determines, by using the BAR, the aperture offset, and the portal offset that are in an address field in a TLP, a portal for writing data. Similarly, the NVMe controller parses the address field in the TLP, and uniquely determines, by using the BAR, the aperture offset, and the portal offset, a portal corresponding to data.

In this embodiment of the present disclosure, the data packet may be a PCIe packet, the association identifier is first address information of the PCIe packet, and the NVMe controller is further configured to: determine second address information based on the first address information, and obtain the write instruction based on the second address information. The second address information is used to indicate a storage location of the write instruction. The first address information may be a portal address of the data packet or some fields of the portal address. That is, the association identifier may be the portal address or some fields of the portal address. The second address information may be further a slot address for storing the write instruction in a submission queue.

That the write instruction is an SQE is used as an example for description. In an optional implementation of this embodiment of the present disclosure, the host and the controller may maintain a correspondence between a portal and a slot in an SQ. A quantity of SQ slots is the same as a quantity of portals, and the SQ slots are in a one-to-one correspondence with the portals. The host separately writes, by using the correspondence between a portal and a slot in an SQ, the SQE and data corresponding to the SQE into the SQ slot and the portal that correspond to each other. The controller may determine a correspondence between an SQE and data based on the correspondence between an SQ slot and a portal, and write the data into the storage medium based on the SQE.

In this embodiment of the present disclosure, the SQ slot for storing the SQE may be used to associate the portal with the write instruction, and the write instruction corresponding to the portal is determined by using the SQ slot. However, a further implementation of associating the write instruction with the portal is not limited in this embodiment of the present disclosure.

In another implementation of this embodiment of the present disclosure, alternatively, the association identifier may include some fields of the write instruction, and the NVMe controller obtains the write instruction based on the association identifier. Further, the association identifier may be indication information of a specific SQE, and is used to uniquely determine the SQE. Alternatively, the host may add the indication information of the SQE to the data packet, to directly associate the SQE with the portal, instead of indirectly associating the SQE with the portal by using the SQ slot. For example, if each SQE in an SQ has a unique command identifier CID, the association identifier may include "queue ID+CID". If a CID of each SQE processed by the NVMe controller is unique, the association identifier may be a CID carried in a corresponding SQE. In another implementation, the association identifier may alternatively be a part of the CID. In this embodiment of the present disclosure, the association identifier may be further specified by using a specially defined SGL type or an SGL subtype or another field of the SQE. A further implementation form of the association identifier is not limited in this embodiment of the present disclosure.

In this embodiment of the present disclosure, the system may support both a portal-based data transfer manner and a conventional data transmission manner. For example, the host may use one or more bits in the CID to indicate whether data associated with the write instruction is transferred in the portal-based transfer manner or in the conventional data transmission manner.

In this embodiment of the present disclosure, the NVMe controller may obtain the write instruction from the submission queue SQ based on the association identifier. Alternatively, the NVMe controller may receive, in the portal-based form, the write instruction pushed by the host. A form of obtaining the write instruction by the NVMe controller is not limited in this embodiment of the present disclosure.

An order in which the NVMe controller obtains the data packet and the write instruction is not limited in this embodiment of the present disclosure. The NVMe controller may first receive the data packet pushed by the host, and determine the write instruction based on the association identifier. Alternatively, the NVMe controller may first obtain the write instruction, and then obtain, based on the write instruction, data received through a corresponding portal. For example, the NVMe controller may determine the association identifier based on the write instruction, determine a corresponding portal based on the association identifier, and obtain, based on the association identifier, stored payload data from storage space allocated for the portal address.

An order in which the host sends the write instruction and the data packet is not limited in this embodiment of the present disclosure. In other words, an order in which data corresponding to the write instruction and the write instruction arrive at the NVMe controller is not limited in this embodiment of the present disclosure.

If the SQE arrives at the NVMe controller before the data, the NVMe controller determines, based on information carried in the SQE, a portal corresponding to the SQE. The NVMe controller may maintain a one-to-one correspondence between an SQ slot and a portal. After obtaining the SQE from a slot, the NVMe controller may determine, based on the maintained correspondence, the portal corresponding to the SQE. If the NVMe detects that no data arrives at the corresponding portal, the NVMe controller suspends the SQE, and waits for data to arrive. After the NVMe controller detects that data arrives at the corresponding portal and obtains a proper part of data through the portal, the NVMe controller may perform a write operation on this part of data. The proper part of data may be that an address and a size of this part of data are aligned with an internal implementation of one write operation performed by the NVMe controller for the storage medium.

If a part of data arrives at the controller before the SQE, the NVMe detects, based on the association identifier carried in the data packet, that the SQE corresponding to the data does not arrive at the NVMe controller or a corresponding SQ slot. The NVMe controller may attach the data to the root data structure, and wait for a related SQE to arrive. When the corresponding SQE arrives at the NVMe controller or an SQ slot that can be addressed by the NVMe controller, the NVMe controller obtains the SQE, and writes the data into the storage medium based on the SQE.

Likewise, if processing of data received through the portal is completed currently, that is, data received through the portal is completely written into the storage medium currently, but the system needs more data to complete the write operation, the NVMe controller suspends the SQE to wait for the data to arrive.

In this embodiment of the present disclosure, receiving, by the NVMe controller through the portal, data pushed by the host and performing, by the NVMe controller, the write operation for the storage medium may be performed concurrently.

In this embodiment of the present disclosure, the host may send the data packet in an order-preserving manner or in a non-order-preserving manner. The NVMe controller may support either or both of the following order modes:

"Strict" mode:

In this mode, the host sends the data packet in a monotonically increasing order of data offsets. The NVMe controller determines an order of payload data in the to-be-written data based on an order of receiving data packets. In this mode, no offset is required, that is, the portal width shown in FIG. 8 may be only 2 bits (specified in a standard).

"Sloppy" mode:

In this mode, the host may send the data packet in any order, but the data packet carries an order identifier (for example, an offset) of the payload data. The NVMe controller reassembles the payload data based on the offset carried in the data packet. In this mode, the data packet needs to carry a data offset. That is, a portal width shown in FIG. 8 needs to be greater than or equal to a maximum data transmission size.

Due to limitations such as a price, power consumption, and a physical size, a size of the internal memory of the NVMe controller is limited. Because storage space of the internal memory of the NVMe has a limited capacity, to prevent buffer overflow, a quantity of simultaneously supported portals needs to be limited. This quantity is limited by "a capacity of the internal memory of the NVMe controller" divided by a "maximum data transmission size". The present disclosure provides a backpressure mechanism to resolve a problem of buffer overflow and overcome a limitation on the capacity of the internal memory of the NVMe controller.

In this embodiment of the present disclosure, the NVMe controller manages the internal memory in a form of a memory block, and the memory block may be a minimum unit that is of the NVMe operation and that cannot be divided. When data arrives at the NVMe controller, the NVMe controller allocates a memory block for the data. After the NVMe controller writes data in the memory block into the storage medium, the NVMe controller releases the memory block.

In this embodiment of the present disclosure, the NVMe controller may organize memory blocks in the internal memory in a form of a memory pool. After data arrives at the NVMe controller from the host, if no memory block is allocated, the NVMe controller allocates a memory block from the memory pool for the data. After data in a memory block is completely written by the NVMe controller into the storage medium based on the SQE, the NVMe controller releases the memory block into the memory pool.

In this embodiment of the present disclosure, the NVMe controller provides the following parameters for the host:

1. a maximum number of available chunks (MNAC) for a portal; and
2. a size C of a memory block.

In this embodiment of the present disclosure, the host maintains a counter. The counter is configured to indicate a quantity of unoccupied memory blocks, that is, a number of available chunks (NAC). The NAC is used to indicate a quantity of remaining memory blocks that can be used by a portal in the memory pool. In a sense, the NAC may be understood as a state of a virtual memory pool. Like hardware resource virtualization, the virtual memory pool means that the memory pool does not actually occupy a physical memory block that has an actual physical address. The state of the entire virtual memory pool is represented only by the NAC. A memory block in the virtual memory pool may be shared by all write operations.

In this embodiment of the present disclosure, for a specific QP or write operation, the host may further request a specific quantity of memory blocks from the NVMe controller according to a rule such as a QP priority or a write operation priority. In this case, the host needs to maintain different virtual memory pools for different subjects (QPs or write operations). In other words, the host needs to correspondingly maintain a plurality of NAC counters for different QPs or write operations.

In this embodiment of the present disclosure, for a write operation, a maximum value of a data amount pushed by the host to the NVMe controller is obtained by multiplying a size of each memory block by a quantity of reserved memory blocks requested by the host for the write operation (if all write operations share a memory pool, the maximum data amount is MNAC×C).

A quantity or a further implementation of memory pools is not limited in this embodiment of the present disclosure. In the following description, one memory pool is used as an example for description in this embodiment of the present disclosure. During initialization, the host sets the NAC to the MNAC. In a process in which the host pushes the data packet to the NVMe controller, the host gradually reduces the counter, and until the NAC is reduced to 0, the host can no longer push data to the NVMe controller. After writing data in the memory block into the storage medium, the NVMe controller sends a memory block release report. The host performs an addition operation on the counter based on a quantity of memory blocks released by the NVMe controller.

In this embodiment of the present disclosure, the NVMe controller may report a memory block release operation to the host by using a "memory block release doorbell", and the doorbell is a smallest PCIe write operation. A further implementation of the memory release doorbell is not limited in this embodiment of the present disclosure. However, the memory release doorbell needs to carry the quantity of memory blocks released by the NVMe controller.

Optionally, the memory release doorbell may further carry an association identifier, and the association identifier is used to indicate a portal (a write operation) corresponding to the released memory block. If the host maintains a plurality of counters, that is, the host separately allocates a virtual memory pool for a QP or a write operation, an association identifier needs to be carried in the memory release doorbell.

Further, the NVMe controller may further provide the host with a preferable number of write chunks per command (PWCC).

In this embodiment of the present disclosure, the host needs to provide the NVMe controller with a PCIe address for receiving a doorbell, and the host cannot lose the doorbell. To reduce pressure on the host to process doorbells, the NVMe controller may aggregate a plurality of doorbells. The host adds a quantity of released memory blocks in the memory release doorbell to a total virtual memory pool (the write operations share the virtual memory pool, and a doorbell signal does not carry the association identifier), or a virtual memory pool corresponding to the portal indicated by the association identifier (the doorbell carries the association identifier, and the host maintains a plurality of virtual resource pools).

In this embodiment of the present disclosure, when performing the write operation, the host needs to reserve a memory block for the write operation. A policy for reserving a memory block by the host is not limited in this embodiment of the present disclosure. The following policy is merely an example for description.

Policy 1: For each write operation, a fixed quantity of memory blocks that does not exceed a quantity of memory blocks required by the write operation is allocated from the "virtual memory block pool". In this policy, the doorbell does not need to carry an association identifier. Once a memory block is released, the host may allocate a new memory block. This policy allows a maximum quantity of write operations to be performed simultaneously.

Policy 2: A quantity of memory blocks required by each write operation are allocated for the write operation. In this policy, the doorbell does not need to carry an association identifier either. When the host cannot allocate a required quantity of memory blocks to a write operation, the host suspends the write operation.

Policy 3: The host calculates an "optimal quantity of write memory blocks" for each write operation. In this policy, the doorbell needs to carry an association identifier. The "optimal quantity of write memory blocks" enables the NVMe controller to achieve maximum performance of performing a single write operation. In this case, reserving more memory blocks cannot further improve performance. The "optimal quantity of write memory blocks" may be determined based on parameters such as a size of the write operation, a round trip time RTT between the host and the NVMe controller, and a PWCC. The host attempts to reserve memory blocks whose quantity is the "optimal write memory block quantity". If the reservation succeeds, the host starts to perform a write operation, and a released write memory block is occupied by the write operation again until a quantity of all memory blocks allocated for the write operation reaches a quantity of memory blocks required by the write operation. If no memory block is reserved, the host may suspend the write operation. If a quantity of reserved memory blocks is less than the "optimal write memory block quantity", the host may still start to perform a write operation, and a released write memory block is occupied by the write operation again until a quantity of all memory blocks allocated for the write operation reaches a quantity of memory blocks required by the write operation. Alternatively, the host may reserve a memory block that is released by another write operation into the "virtual memory block pool" until a quantity of memory blocks occupied by the write operation reaches a "required quantity of memory blocks".

According to the technical solution disclosed in this embodiment of the present disclosure, when performing an NVMe-based write operation, the host actively pushes the to-be-written data to the NVMe controller in a data packet form, and adds the association identifier to the packet, to associate the to-be-written data with the write instruction SQE. The SQE does not need to carry data storage location information, and the host no longer needs to completely prepare data before sending the SQE, thereby reducing a delay of the write operation, and reducing storage space for storing the to-be-written data by the host. In addition, the SQE may no longer carry address information of the to-be-written data, thereby reducing bus load.

Figure 10:
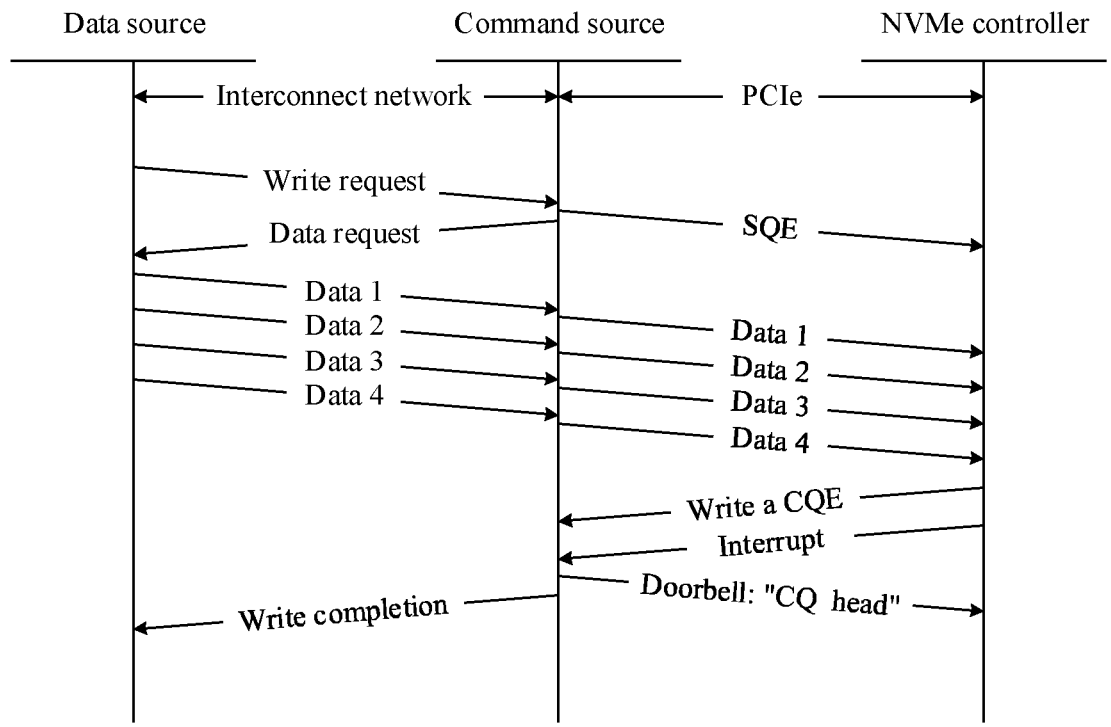
FIG. 10 is a signaling diagram of an NVMe-based data writing method according to an embodiment.

FIG. 10 is an interaction flowchart of an NVMe-based data writing method 1000 according to an embodiment. As shown in FIG. 10, an application scenario of the method 1000 is a scenario in which a data source is separated from a command source. The data source needs to write to-be-written data into a storage medium by using an NVMe controller.

Figure 11A:
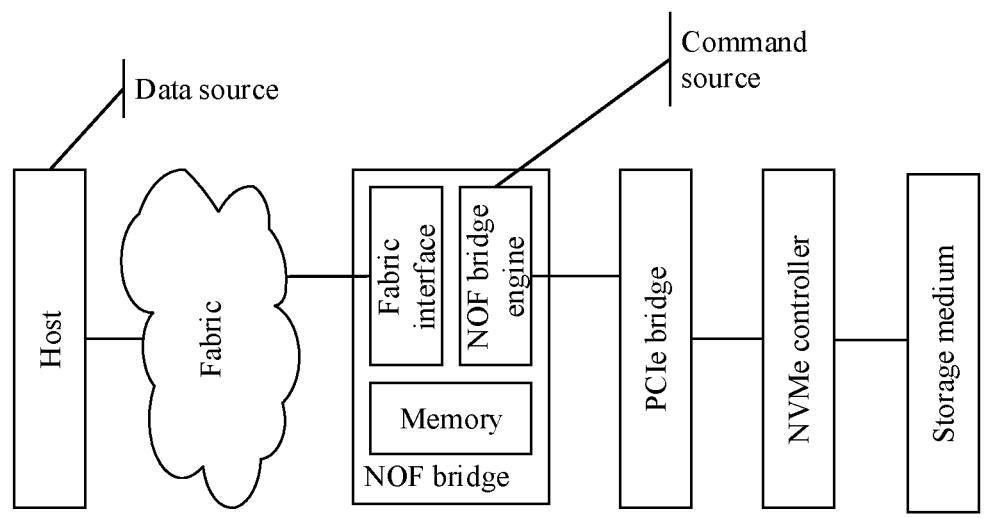
FIG. 11(a) is a schematic diagram of a logical structure of an NVMe system according to an embodiment.
Figure 11B:
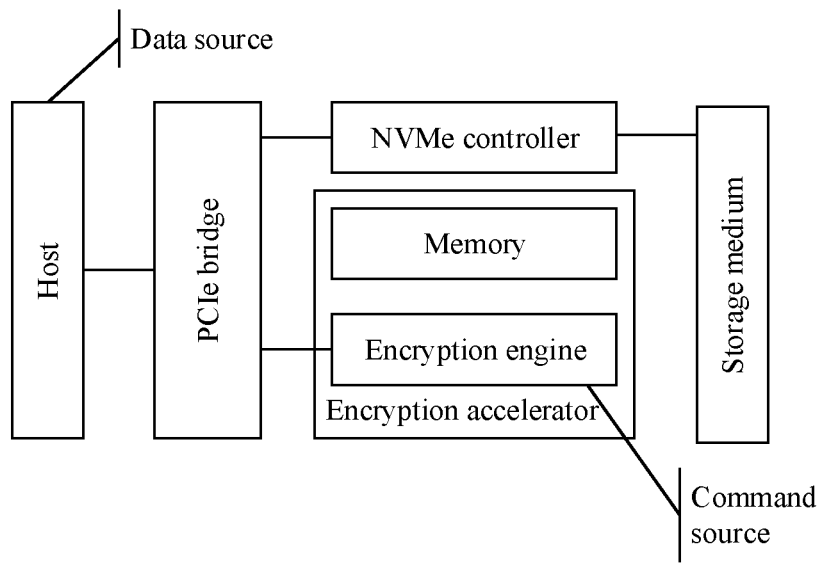
FIG. 11(b) is a schematic diagram of a logical structure of an NVMe system according to an embodiment.

For example, in this embodiment of the present disclosure, the scenario in which the data source is separated from the command source may be just a bunch of flash (JBOF) based on a NVMe over fabric (NOF for short). As shown in FIG. 11 (*a*), a data source is a host that needs to access a storage medium, and a command source is a NOF bridge that is intercoupled to the host by using a fabric. More further, the command source may be a NOF engine in the NOF bridge. The NOF bridge is intercoupled to the NVMe controller by using a PCIe bus, and the NVMe controller is coupled to the storage medium.

In this embodiment of the present disclosure, alternatively, the scenario in which the data source is separated from the command source may be a scenario in which the data source is the host and the command source is the encryption accelerator. As shown in FIG. 11 (*b*), the data source is the host, and the command source is an encryption accelerator intercoupled to the host. More further, the command source is an acceleration engine of the encryption accelerator. The encryption accelerator is intercoupled to the NVMe controller by using a PCIe bus, and the NVMe controller is coupled to the storage medium.

In this embodiment of the present disclosure, after receiving some data from the data source, the command source may trigger the SQE to the NVMe controller and push the received some data. The SQE does not need to wait for to-be-written data to be completely sent from the data source to the command source. A further form in which the command source triggers the SQE to the NVMe controller is not limited in this embodiment of the present disclosure. The command source may write the SQE into the SQ, and notify the NVMe controller by using a doorbell, or send the SQE to the NVMe controller in another form.

In this embodiment of the present disclosure, the data source is separated from the command source, the data source and the command source are coupled by using an interconnect network, and the data source cannot directly communicate with the NVMe controller. For example, the NVMe controller may not directly access storage space of the data source. When the data source needs to write the to-be-written data into the storage medium by using the NVMe controller, data needs to be sent to the command source.

When the data source has a write requirement, the data source sends a write request to the command source by using the interconnect network. After receiving the write request from the data source, the command source may directly trigger the SQE to the NVMe controller without waiting for the data to arrive. After receiving the write request, the command source sends a data request to the data source. The data source sends the data to the command source based on the data request. After receiving some data, the command source may push the data to the NVMe controller, and does not need to push the data to the NVMe controller until all the data arrives. The command source may implement a pipeline manner. To be further, the command source may concurrently receive data from the data source and push the received data to the NVMe controller. In the pipeline manner, storage space used to buffer data is saved, and a write operation processing speed is also increased.

Figure 12:
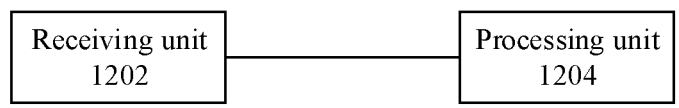
FIG. 12 is a schematic diagram of a logical structure of an NVMe controller according to an embodiment.

FIG. 12 is a schematic diagram of a logical structure of an NVMe controller 1200 according to an embodiment. As shown in FIG. 12, the NVMe controller 1200 includes:

a receiving unit 1202, configured to receive a data packet from a host, where the data packet carries payload data and an association identifier, and the association identifier is used to associate the payload data with a write instruction; and a processing unit 1204, configured to: obtain the write instruction, and write the payload data into a storage medium according to the write instruction.

Optionally, the NVMe controller 1200 further includes an internal memory, and before writing the payload data into the storage medium, the processing unit 1204 is further configured to: allocate storage space in the internal memory for the payload data, store the payload data in the allocated storage space, and record a mapping relationship between the allocated storage space and the association identifier.

Optionally, the internal memory includes a plurality of memory blocks, and the processing unit 1204 is further configured to provide the host with a quantity of memory blocks in the internal memory and a size of the memory block.

Optionally, after writing the payload data into the storage medium, the processing unit 1204 is further configured to trigger a memory block release report. The memory block release report is used to indicate that the NVMe controller 1200 releases a memory block.

Optionally, the memory block release report further includes the association identifier, and the memory block release report is used to indicate that the NVMe controller 1200 releases a memory block occupied by a write operation corresponding to the association identifier.

Optionally, the data packet is a PCIe packet, the association identifier is first address information of the PCIe packet, and the processing unit 1204 is further configured to: determine second address information based on the first address information, and obtain the write instruction based on the second address information. The second address information is used to indicate a storage location of the write instruction.

Optionally, the association identifier includes some fields of the write instruction, and the processing unit 1204 is further configured to obtain the write instruction based on the association identifier.

Optionally, the processing unit 1204 is further configured to: determine the association identifier based on the write instruction, and obtain the payload data from the allocated storage space based on the association identifier.

Optionally, the processing unit 1204 is further configured to determine an order of payload data in to-be-written data based on an order of receiving data packets.

Optionally, the data packet further carries an order identifier, and the order identifier is used to indicate the order of the payload data in the to-be-written data.

In this embodiment, the receiving unit 1202 and the processing unit 1204 may be further implemented by the write operation logic 305 in the processor 301 in FIG. 3, or implemented by the processor 301 in FIG. 3 and the write operation module 304 in the system memory 302.

This embodiment is an apparatus embodiment of the NVMe controller corresponding to the foregoing embodiments. Feature descriptions in the foregoing embodiments are applicable to this embodiment. Details are not described herein again.

Figure 13:
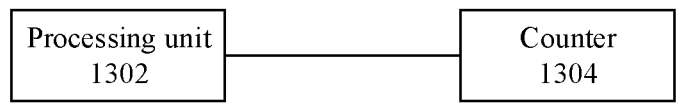
FIG. 13 is a schematic diagram of a logical structure of a computing device according to an embodiment.

FIG. 13 is a schematic diagram of a logical structure of a computing device 1300 according to an embodiment. As shown in FIG. 13, the computing device 1300 includes:

a processing unit 1302, configured to: trigger a write instruction, and push a data packet to an NVMe controller, where the data packet carries payload data and an association identifier, and the association identifier is used to associate the payload data with the write instruction.

Optionally, the data packet is a PCIe packet, the association identifier is first address information of the PCIe packet, there is a mapping relationship between the first address information and second address information, and the second address information is used to indicate a storage location of the write instruction. The first address information may be all or some of fields of a PCIe address in a TLP packet header, and the second address information may be all or some fields of address information in a slot in an SQ.

Optionally, the association identifier includes some fields of the write instruction, and the association identifier is used to uniquely determine the write instruction. For example, the association identifier may be a CID of an SQE, some fields of a CID, or the like.

Optionally, the processing unit 1302 is further configured to obtain a quantity of memory blocks in an internal memory of the NVMe controller and a size of the memory block. The memory block is configured to store data from the computing device 1300.

The host may further include a counter 1304. The counter 1304 is configured to indicate a quantity of unoccupied memory blocks in the memory storage of the NVMe controller. After the processing unit 1302 sends the data packet to the NVMe controller, the counter 1304 is further configured to reduce a value of the counter 1304.

Optionally, the processing unit 1302 is further configured to: obtain a memory block release report triggered by the NVMe controller, and increase a value of the counter 1304 based on the memory block release report. The memory block release report is used to indicate that the NVMe controller releases a memory block.

Optionally, the computing device 13001300 includes a plurality of counters 1304, and each counter 1304 corresponds to at least one write instruction. The memory block release report further includes the association identifier, and the processing unit 1302 is configured to increase, based on the memory block release report and the association identifier, a value of a counter 1304 corresponding to the write instruction.

In this embodiment, the receiving unit 1302 may be further implemented by the write operation logic 410 in the processor 401 in FIG. 4, or implemented by the processor 401 in FIG. 4 and the write operation module 406 in the system memory 402. The counter 1304 may be implemented by using the system memory 402 or a register in the processor 401.

This embodiment is an apparatus embodiment of the host corresponding to the foregoing embodiments. Feature descriptions in the foregoing embodiments are applicable to this embodiment. Details are not described herein again.

The foregoing embodiments are merely intended for describing the technical solutions, but not for limiting this application. Although this application is described in detail with reference to the foregoing embodiments, persons of ordinary skill in the art should understand that they may still make modifications to the technical solutions recorded in the foregoing embodiments or make replacements to some technical features thereof, without departing from the protection scope of the claims.

What is claimed is:

1. A non-volatile memory express (NVMe)-based data storage system, comprising:
a host;
an NVMe controller; and
a storage medium for storing data, wherein the host is connected to the NVMe controller through a peripheral component interconnect express (PCIe) bus, and the NVMe controller is connected to the storage medium;
wherein the host is configured to:
send a data packet to the NVMe controller, wherein the data packet carries payload data and an association identifier, and the association identifier associates the payload data with a write instruction;
wherein the NVMe controller is configured to:
obtain the write instruction according to the association identifier; and
write the payload data into the storage medium according to the write instruction;
wherein the NVMe controller comprises an internal memory, and before writing the payload data into the storage medium, the NVMe controller is further configured to:
allocate storage space in the internal memory for the payload data;
store the payload data in the allocated storage space; and
record a mapping relationship between the allocated storage space and the association identifier;
wherein the internal memory comprises a plurality of memory blocks;
wherein the NVMe controller is further configured to provide the host with a quantity of memory blocks in the internal memory and a size of the memory block;
wherein the host further comprises a counter configured to indicate a quantity of unoccupied memory blocks; and
wherein after sending the data packet to the NVMe controller, the host is further configured to reduce a value of the counter.

2. The system according to claim 1, wherein after writing the payload data into the storage medium, the NVMe controller is further configured to trigger a memory block release report, and the memory block release report indicates that the NVMe controller releases one or more memory blocks; and
wherein the host is further configured to: obtain the memory block release report, and increase the value of the counter based on the memory block release report.

3. The system according to claim 2, wherein the host comprises a plurality of counters, and each counter corresponds to at least one write instruction;
wherein the memory block release report further comprises the association identifier; and
wherein the host is further configured to increase, based on the memory block release report and the association identifier, a value of a counter corresponding to the write instruction.

4. The system according to claim 1, wherein the data packet is a PCIe packet, and the association identifier is first address information of the PCIe packet; and
wherein the NVMe controller is further configured to:
determine second address information based on the first address information; and
obtain the write instruction based on the second address information, wherein the second address information indicates a storage location of the write instruction.

5. The system according to claim 1, wherein the NVMe controller is further configured to:
determine the association identifier based on the write instruction; and
obtain the payload data from the storage space based on the association identifier.

6. The system according to claim 1, wherein the NVMe controller is further configured to determine an order of the payload data in to-be-written data based on an order of receiving data packets.

7. The system according to claim 1, wherein the data packet further carries an order identifier, and the order identifier indicates an order of the payload data in to-be-written data.

8. The system according to claim 1, wherein the host is further configured to generate the write instruction.

9. A data writing method performed by a non-volatile memory express (NVMe) controller, comprising:
receiving a data packet from a host, wherein the host is connected to the NVMe controller through a peripheral component interconnect express (PCIe) bus, and the NVMe controller is connected to a storage medium, and wherein the data packet carries payload data and an association identifier, and the association identifier associates the payload data with a write instruction;
obtaining the write instruction according to the association identifier; and
writing the payload data into the storage medium according to the write instruction;
wherein the NVMe controller comprises an internal memory, and before writing the payload data into the storage medium, the method further comprises:
allocating storage space in the internal memory for the payload data;
storing the payload data in the allocated storage space; and
recording a mapping relationship between the allocated storage space and the association identifier;
wherein the internal memory comprises a plurality of memory blocks;
wherein the method further comprises:
providing the host with a quantity of memory blocks in the internal memory and a size of the memory block;
wherein after writing the payload data into the storage medium, the method further comprises:
triggering a memory block release report, wherein the memory block release report indicates that the NVMe controller releases one or more memory blocks; and
wherein the memory block release report further comprises the association identifier, and the memory block release report indicates that the NVMe controller releases one or more memory blocks occupied by a write operation corresponding to the association identifier.

10. The method according to claim 9, wherein the data packet is a PCIe packet, and the association identifier is first address information of the PCIe packet, and the method further comprises:
determining second address information based on the first address information; and
obtaining the write instruction based on the second address information, wherein the second address information indicates a storage location of the write instruction.

11. The method according to claim 9, wherein the association identifier comprises fields of the write instruction; and
wherein the method further comprises:
obtaining the write instruction based on the association identifier.

12. The method according to claim 9, further comprising:
determining the association identifier based on the write instruction; and
obtaining the payload data from the storage space based on the association identifier.

13. The method according to claim 9, further comprising:
determining an order of the payload data in to-be-written data based on an order of receiving data packets.

14. A non-volatile memory express (NVMe) controller in a NVMe-based storage system, wherein a host is connected to the NVMe controller through a peripheral component interconnect express (PCIe) bus, and the NVMe controller is connected to a storage medium, the NVMe controller comprising:
a memory storing executable instructions; and
a processor configured to execute the executable instructions to configure the NVMe controller to perform operations comprising:
receiving a data packet from the host, wherein the data packet carries payload data and an association identifier, and the association identifier associates the payload data with a write instruction;
obtaining the write instruction according to the association identifier; and
writing the payload data into the storage medium according to the write instruction;
wherein the NVMe controller comprises an internal memory, and before writing the payload data into the storage medium, the operations further comprise:
allocating storage space in the internal memory for the payload data;
storing the payload data in the allocated storage space; and
recording a mapping relationship between the allocated storage space and the association identifier;
wherein the internal memory comprises a plurality of memory blocks;
wherein the operations further comprise:
providing the host with a quantity of memory blocks in the internal memory and a size of the memory block;
wherein after writing the payload data into the storage medium, the operations further comprise:
triggering a memory block release report, wherein the memory block release report indicates that the NVMe controller releases one or more memory blocks; and
wherein the memory block release report further comprises the association identifier, and the memory block release report indicates that the NVMe controller releases one or more memory blocks occupied by a write operation corresponding to the association identifier.

* * * * *